(12) United States Patent
Thomas et al.

(10) Patent No.: US 7,670,249 B2
(45) Date of Patent: Mar. 2, 2010

(54) MULTIPLE SPEED AUTOMATIC TRANSMISSION

(75) Inventors: Steven G. Thomas, Bloomfield Hills, MI (US); Donald E. Hoffman, Canton, MI (US); Gregory D. Goleski, Clarkston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 427 days.

(21) Appl. No.: 11/728,448

(22) Filed: Mar. 26, 2007

(65) Prior Publication Data

US 2008/0242470 A1   Oct. 2, 2008

(51) Int. Cl.
  *F16H 3/62* (2006.01)
(52) U.S. Cl. .................. 475/276; 475/275; 475/332
(58) Field of Classification Search ............. 475/275, 475/278, 284, 288, 338, 341, 332, 276
  See application file for complete search history.

(56) References Cited

U.S. PATENT DOCUMENTS

| | | | | |
|---|---|---|---|---|
| 3,453,907 | A * | 7/1969 | Noguchi et al. | ............. 475/176 |
| 6,033,336 | A * | 3/2000 | Bae | ............. 475/341 |
| 6,746,354 | B1 * | 6/2004 | Ziemer | ............. 475/5 |
| 6,752,738 | B1 | 6/2004 | Martin et al. | |
| 6,910,985 | B2 | 6/2005 | Ishimaru et al. | |
| 6,976,931 | B2 | 12/2005 | Raghavan et al. | |
| 6,991,578 | B2 * | 1/2006 | Ziemer | ............. 475/296 |
| 7,029,416 | B2 | 4/2006 | Miyazaki et al. | |
| 7,037,232 | B2 | 5/2006 | Ishimaru | |
| 7,041,027 | B2 | 5/2006 | Bucknor et al. | |
| 7,056,258 | B2 | 6/2006 | Bucknor et al. | |
| 7,294,087 | B2 * | 11/2007 | Hayabuchi et al. | ............. 475/276 |
| 2004/0116238 | A1 * | 6/2004 | Ziemer | ............. 475/296 |
| 2007/0037657 | A1 * | 2/2007 | Thomas et al. | ............. 475/284 |

FOREIGN PATENT DOCUMENTS

DE        4207586 A1 *   9/1993

\* cited by examiner

*Primary Examiner*—David D Le
*Assistant Examiner*—Justin Holmes
(74) *Attorney, Agent, or Firm*—David B. Kelley; MacMillan, Sobanski & Todd, LLC

(57) ABSTRACT

A multi-speed automatic transmission includes an input, an output, a first gear unit drivable connected to the input and including a component rotating at the speed of the input and a first gear unit output, the first gear unit producing a gear ratio of a speed of the input and a speed of the first gear unit output, a planetary gear unit including a modified Simpson gearset, the gear unit being secured to first, second, third, fourth and fifth rotating members, the fifth member being secured to the output for rotation therewith, a first clutch being operable to connect the first rotating member and the first gear unit output, a second clutch being operable to connect the second rotating member and the first gear unit output, a third clutch being operable to connect the third rotating member and an element rotating at a speed of the input, a fourth clutch being operable to connect the fourth rotating member and said element rotating at the speed of the input, a first brake being operable to hold the fourth rotating member against rotation, and a second brake being operable to hold the third rotating member against rotation.

3 Claims, 4 Drawing Sheets

| GEAR | 62 CLUTCH A | 64 CLUTCH B | 68 BRAKE C | 53 BRAKE D | 52 CLUTCH E | 66 CLUTCH F | RATIO | STEP |
|---|---|---|---|---|---|---|---|---|
| 1st | X | | | X | | | 6.3872 | 1.8261 |
| 2nd | X | | X | | | | 3.4977 | 1.5545 |
| 3rd | X | X | | | | | 2.2500 | 1.4459 |
| 4th | X | | | | | X | 1.5561 | 1.2516 |
| 5th | | | | | X | X | 1.2433 | 1.2433 |
| 6th | | | | | X | | 1.0000 | 1.2433 |
| 7th | | X | | | X | | 0.8065 | 1.1548 |
| 8th | | | X | | | | 0.6984 | |
| LOW REV | | X | | X | | | -5.2105 | |
| HIGH REV | | | | X | | X | -2.3158 | |

FIG. 2

| | SUN GEAR | RING GEAR | PINION | SHARED PINION | BETA RATIO |
|---|---|---|---|---|---|
| PLAN 1A | | 170 | | 68 | |
| PLAN 1B | | 153 | | 34 | |
| PLAN 2A | 38 | 88 | | 25 | 2.3158 |
| PLAN 2B | 38 | 110 | | 25 | 1.8033 |
| PLAN 3 | 61 | | 26 | | |

FIG. 3

| GEAR | 114 CLUTCH A | 116 CLUTCH B | 118 BRAKE C | 120 BRAKE D | 122 CLUTCH E | 124 CLUTCH F | RATIO | STEP |
|---|---|---|---|---|---|---|---|---|
| 1st | X | | | X | | | 7.0969 | |
| 2nd | X | | X | | | | 3.8864 | 1.8261 |
| 3rd | X | X | | | | | 2.5000 | 1.5545 |
| 4th | X | | | | | X | 1.6286 | 1.5351 |
| 5th | | | | | X | X | 1.2680 | 1.2844 |
| 6th | | | | | X | X | 1.0000 | 1.2680 |
| 7th | | X | | | X | | 0.7942 | 1.2591 |
| 8th | | X | X | | | | 0.6984 | 1.1372 |
| LOW REV | | | | X | | | -5.7895 | |
| HIGH REV | | | | X | | X | -2.3158 | |

FIG. 5

| | SUN GEAR | RING GEAR | PINION | SHARED PINION | BETA RATIO |
|---|---|---|---|---|---|
| PLAN 1 | 60 | 90 | 15 | | 1.5000 |
| PLAN 2A | 61 | 110 | | 26 | 1.8033 |
| PLAN 2B | 61 | | | 26 | |
| PLAN 3A | 38 | 88 | | 25 | 2.3158 |
| PLAN 3B | | 88 | | 25 | |

FIG. 6

MULTIPLE SPEED AUTOMATIC TRANSMISSION

BACKGROUND OF THE INVENTION

1. Field of the Invention

This invention relates to the field of automatic transmissions for motor vehicles. More particularly, the invention pertains to a kinematic arrangement of gearing, clutches, brakes, and the interconnections among them in a power transmission.

2. Description of the Prior Art

A truck customer may desire improved launch capability, particularly when the vehicle is loaded and/or starting on a grade. The vehicle manufacturer offers customers options to allow improved launch capability. One option is to choose steeper (higher numerical) axle ratios. For those who have chosen a 4×4 truck, the transfer case generally is 2 speeds, one speed of which is a low-range which can also improve launch capability.

The steeper axle ratios improve vehicle launch capability when loaded, but reduce fuel economy even when the vehicle is unloaded. Offering multiple axle ratios adds complexity to the vehicle assembly plant. Operators of light trucks having 4×4 drivelines rarely use the low-range capability of a two-speed transfer case. The clutch mechanism for selecting low and high-ranges of the transfer case cannot be shifted unless the vehicle is stopped.

Most operators of such vehicle are accustomed to and prefer a small first-second gear step size of the transmission, which is 1.414 in a current production transmission. Eight-speed transmissions that have been proposed have gear mesh losses that exceeded those of highly efficient six-speed transmissions.

There is a need for a power transmission that can produce eight forward speeds and two reverse speeds, has high theoretical gear mesh efficiency and a wide speed ratio span.

SUMMARY OF THE INVENTION

A multiple-speed automatic transmission includes (a) an input, (b) an output, (c) a first gear unit drivable connected to the input and including a component rotating at the speed of the input and a first gear unit output, the first gear unit producing a gear ratio of a speed of the input and a speed of the first gear unit output, the gear ratio being greater than unity, and (d) a modified Simpson gear unit for producing multiple ratios of the speed of the input and a speed of the output, the modified Simpson gear unit being driveably connected to first, second, third, fourth, and fifth rotating members, the fifth member being secured to the output for rotation therewith. The modification to the Simpson gear unit involves extending one of the sets of the planetary pinions to allow engagement to an additional sun gear. A first clutch connects the first rotating member and first gear unit output; a second clutch connects the second rotating member and first gear unit output; a third clutch connects the third rotating member and an element rotating at transmission input speed; a fourth clutch connects the fourth rotating member and an element rotating at transmission input speed; a first brake holds the fourth rotating member against rotation, and a second brake holds the third rotating member against rotation.

The transmission can produce eight forward speeds and two reverse speeds, has high theoretical gear mesh efficiency and a wide speed ratio span. The eight-speed transmission provides two drive modes. Mode 1 could replace the conventional offering of optional axle ratios and the two speed transfer case. The transmission has a low-range first gear, which can either be used for launching the vehicle, such as when the operator is hauling a trailer, or as the low-range launch gear for 4×4 operations.

The transmission provides the ability to shift from low-range to high-range under full torque. When normal launch mode is required, the transmission provides a second gear with a conventional first-gear launch ratio. The seven speeds from second gear through eighth gear provide a close ratio gearbox with a span greater than five.

The transmission provides excellent fuel economy in normal drive mode. A manually operated selector switch for 4×4 vehicles can incorporate 4×2, 4×4 high and 4×4 low selectable positions, and can have added functions, such as 4×4 auto, trailer tow, and snow modes. These modes are achieved by starting the transmission in first, second or third gear and by using a 4×4 on demand clutch in off, stand-by or applied mode.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages of the present invention will become readily apparent to those skilled in the art from the following detailed description of a preferred embodiment when considered in the light of the accompanying drawings in which:

FIG. 2 is chart showing for each forward and reverse speed ratio the operating state of the clutches and brakes that control the transmission of FIG. 1, and a preferred speed ratio for each gear;

FIG. 3 is a chart showing a preferred number of gear teeth for each gear and pinion of the transmission of FIG. 1 and the beta ratios of the modified Simpson and speed reduction gearsets;

FIG. 5 is chart showing for each forward and reverse gear the operating state of the clutches and brakes that control the transmission of FIG. 4, and a preferred speed ratio for each gear; and FIG. 6 is a chart showing a preferred number of gear teeth for each gear and pinion of the transmission of FIG. 4 and the beta ratios of the modified Simpson and speed reduction gearsets.

DESCRIPTION OF THE PREFERRED EMBODIMENT

Figure 1:
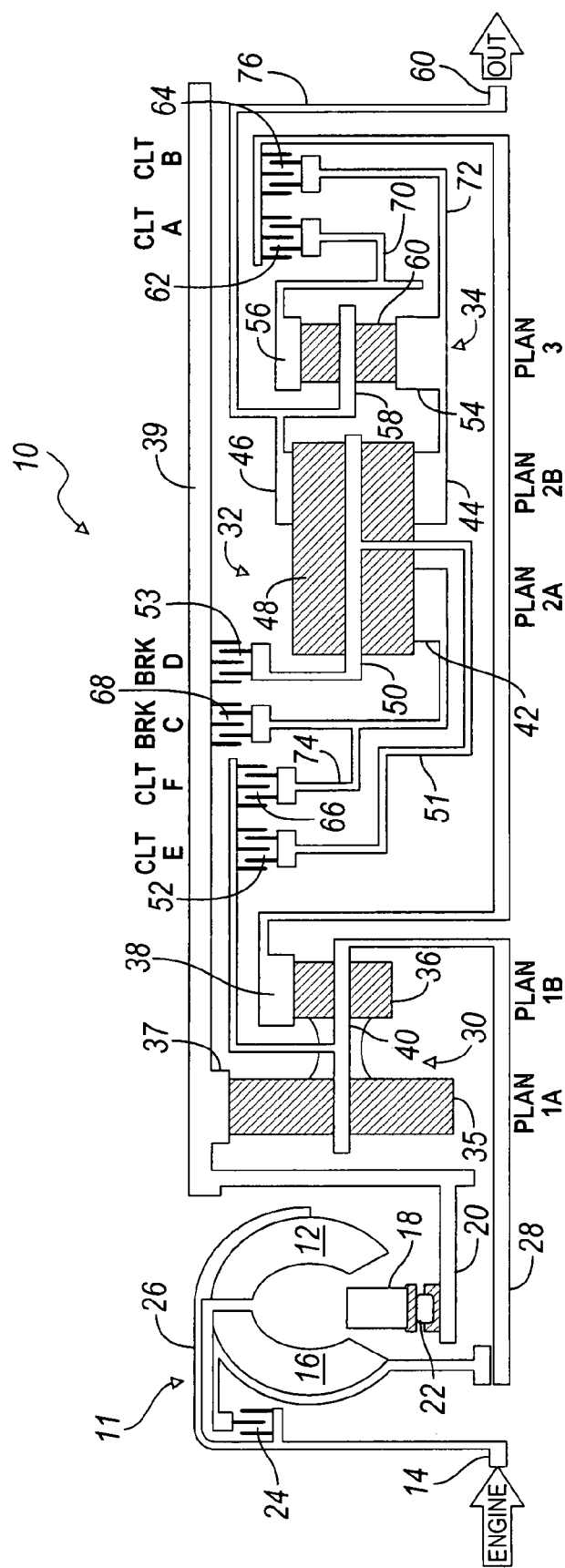
FIG. 1 is a schematic diagram illustrating the kinematic arrangement of a transmission, which incorporates a modified Simpson gearset.

Referring now to the drawings, there is illustrated in FIG. 1 the kinematic arrangement of an automatic transmission 10 A torque converter 11 includes a bladed impeller wheel 12 connected to the crankshaft 14 of an internal combustion engine, a bladed turbine wheel 16, and a bladed stator wheel 18. The impeller, stator and turbine wheels define a toroidal fluid flow circuit, whereby the impeller is hydrokinetically connected to the turbine. The stator 18 is supported rotatably on a stationary stator sleeve shaft 20, and an overrunning brake 22 anchors the stator to the shaft 20 to prevent rotation of the stator in a direction opposite the direction of rotation of the impeller, although free-wheeling motion in the direction of rotation of the impeller is permitted.

The torque converter 11 includes a lockup clutch 24 located within the torque converter impeller housing 26. When clutch 24 is engaged, the turbine and impeller are mechanically connected to a transmission input shaft 28; when clutch 24 is disengaged, the turbine and impeller are hydrokinetically connected and mechanically disconnected. Fluid contained in the torque converter is supplied to the torque converter from the output of an oil pump assembly (not shown) and is returned to an oil sump, to which an inlet of the pump is connected hydraulically.

A planetary gear system includes first, second, and third gear units 30, 32, 34. The first gear unit 30 is a speed reduction gear unit which includes two ring gears 37 and 38, a carrier 40, stepped pinions 35 and 36 which are rotatably supported on carrier 40, and no sun gears. The carrier 40 is secured to the input 28 and the ring gear 37 is grounded on the transmission case 39. The stepped pinions 35 and 36 are joined to rotate together. The pinion 35 is in mesh with the ring gear 37 and the pinion 36 is in mesh with the ring gear 38. The second ring gear 38 is the output of gear unit 30 and is underdriven relative to the speed of input 28. For the specific example set forth in FIG. 3, which lists the number of gear teeth, the output speed ratio produced by the front planetary gear unit 30 is 0.444.

The second gear unit 32 includes axially spaced sun gears 42, 44, a ring gear 46, carrier 50, and long planetary pinions 48, rotatably supported on carrier 50 and in meshing engagement with sun gears 42, 44 and ring gear 46. A bridging member 51, secured to carrier 50 and extending radially between the first sun gear 42 and second sun gear 44, is driveably connected to a clutch 52. In this way, carrier 50 is accessible to clutch 52 and to a brake 53.

The third gear unit 34 includes a sun gear 54, ring gear 56, carrier 58, and planetary pinions 60, rotatably supported on carrier 58 in meshing engagement with sun gear 54 and ring gear 56.

The ring gear 37 of the first gear unit 30 is fixed against rotation. The carrier 40 of the first gear unit 30 is driveably connected to the input 28. The ring gear 46 of the second gear unit 32 is driveably connected to the carrier 58 of the third gear unit 34, which is driveably connected to output 60. The second sun gear 44 of the second gear unit 32 is driveably connected to the sun gear 54 of the third gear unit 34.

Ring gear 56 of the third gear unit is alternately connected to and disconnected from ring gear 38 of the first gear unit by clutch 62. Sun gear 44 of the second gear unit and sun gear 54 of the third gear unit are alternately connected to and disconnected from ring gear 38 of the first gear unit by clutch 64. Carrier 50 of the second gear unit is alternately connected to and disconnected from carrier 40 of the first gear unit by clutch 52. Sun gear 42 of the second gear unit is alternately connected to and disconnected from carrier 40 of the first gear unit by clutch 66.

Sun gear 42 is alternately held against rotation, preferably on the transmission case 39, upon engagement of a brake 68 and are released for free rotation upon disengagement of brake 68. Carrier 50 is alternately held against rotation, preferably on the transmission case 39, upon engagement of a brake 53 and is released for free rotation upon disengagement of brake 53.

Clutches 52, 66, 62, 64 and brakes 53, 68, are preferably hydraulically-actuated friction devices having sets of interleaved friction discs and spacer plates, the discs being secured to one element of the clutch or brake, the spacer plates secured to another element of the clutch or brake. When hydraulic pressure increases in the cylinder of a servo that actuates a respective friction element, the discs and plates of the respective friction element are forced by displacement of the servo piston into mutual frictional contact, thereby producing a drive connection between the components of the gear units to which the elements of the clutch or brake are secured. When the pressure is vented from the servo cylinder, the clutch or brake is disengaged and the components are free to rotate independently. U.S. Pat. No. 4,943,921 describes and illustrates examples of hydraulically actuated friction clutches and brakes, which can be used in the transmission of this invention.

The front planetary gear unit 30 is a stepped pinion design with two ring gears 37, 38 and no sun gears. Input 28 is fixed to carrier 40. Ring gear 37 is fixed to ground 39. Ring gear 38 is the fixed a low speed output of the front planetary gear unit 30, to which is attached one side of a clutch A 62 and one side of clutch B 64.

The rear planetary units 32, 34 comprise a modified Simpson design having five elements, one of which provides the output 60. Sun gears 44 and 54, ring gears 46 and 56, and carriers 50 and 58 constitute the Simpson gearset. The modification to the Simpson design comes from extending carrier 50 and pinion 48 so that an additional sun gear 42 can mesh with the pinion 48. Since sun gears 42 and 44 both have the same number of teeth, and pinion 48 has a constant number of teeth across its width, sun gear 42 is forced to always rotate at the same speed as sun gears 44 and 54. Sun gear 42 effectively becomes an extension of sun gears 44 and 54. This is done so that the sun gears 44 and 54 have access to brake C 68 and clutch F 66 via sun gear 42, while allowing a web from carrier 50 to fit between sun gears 42 and 44 and have access to clutch E 52.

The gear ratio of a power path or a transmission is the ratio of the speed of its input to the speed of its output. A speed reduction power path, whose gear ratio is greater than unity, driveably connects input 28 and carrier 40 of the gear unit 30 through ring gear 38 to clutches 62, 64. A second power path, whose speed ratio is equal to unity, driveably connects input 28 and carrier 40 to clutches 52, 66. Preferably, the first power path underdrives ring gear 38 and the input of clutches 62, 64 at 0.444 times the speed of the input 28, provided the number of gear teeth of the pinions and gears is as set forth in FIG. 3.

Operation of the transmission 10 is described next with reference to the engaged and disengaged state of the friction elements, which states in combination produce each of the gear ratios. Preferably, the states of the clutches and brakes are changed automatically in accordance with execution of a control algorithm by an electronic transmission controller. FIG. 2 is a chart indicating the state of engagement and disengagement of the clutches and brakes corresponding to each of the gear ratios. In the chart, symbol "X" identifies an engaged friction clutch and friction brake. A blank indicates that the corresponding clutch and brake is disengaged or released. FIG. 2 shows for each forward and reverse gear the operating state of the clutches and brakes that control the transmission of FIG. 1 and the gear ratio for the respective gear.

The transmission 10 operates in the first forward gear when clutch 62 and brake 53 are engaged, and the other friction elements are disengaged. With ring gear 37 of the first gear unit 30 held against rotation and its carrier 40 directly connected to input 28, the speed of ring gear 38 is underdriven relative to the speed of input 28. Ring gear 56 is driveably connected to ring gear 38 through clutch 62. Brake 53 holds carrier 50 against rotation and produces a torque reaction on the transmission case 39. With carrier 50 held against rotation, sun gears 44, 54 mutually secured to rotate at the same speed, and carrier 58 and ring gear 46 secured mutually for rotation at the same speed, ring gear 46 and output 60 are underdriven due to an additional speed reduction. With the transmission operating in first gear, the ratio of the speed of input 28 and the speed of output 60 is 6.387, provided the number of gear teeth of the pinions and gears is as set forth in FIG. 3.

As FIG. 2 shows, the transmission operates in each of the five lowest forward gears when clutch 62 is engaged; therefore, when the transmission 10 operates in each of the five lowest forward gears, ring gear 56 is underdriven relative to the speed of input 28.

An upshift to the second speed ratio results by maintaining clutch 62 engaged, engaging brake 68, and disengaging brake 53. Ring gear 56 is underdriven relative to the speed of input 28 due to the speed reduction produced in gear unit 30. Sun gear 42, fixed against rotation due to the engagement of brake 68, provides a torque reaction. Sun gears 44, 54 are secured mutually to rotate at the same speed. Therefore, the ring gear 46 and output 60 are underdriven relative to the ring gear 56 due to a second speed reduction produced in gear units 32, 34. With the transmission operating in second gear, the ratio of the speed of input 28 and the speed of output 60 is 3.498, provided the number of gear teeth of the pinions and gears is as set forth in FIG. 3.

An upshift to third gear from second gear results upon disengaging brake 68, engaging clutch 64, and maintaining clutch 62 engaged. Ring gear 38 is underdriven relative to the speed of the input due to the speed reduction produced in the first gear unit 30. Clutch 64 driveably connects ring gear 38 to sun gears 44, 54. Clutch 62 driveably connects ring gear 38 to ring gear 56. Because the speeds of sun gears 46, 54 and ring gear 56 are equal and underdriven relative to the speed of input 28, carrier 58, ring gear 46 and output 60 are underdriven at that same speed. With the transmission operating in third gear, the ratio of the speed of input 28 and the speed of output 60 is 2.250.

An upshift to fourth gear from third gear results upon engaging clutch 66, disengaging clutch 64, and maintaining clutch 62 engaged. Clutch 66 driveably connects sun gear 42 and input 28. Clutch 62 driveably connects ring gear 38 to ring gear 56. Due to the speed reduction produced in the first gear unit 30, ring gear 40 is underdriven relative to the speed of the input 28. With the transmission operating in fourth gear, the ratio of the speed of input 28 and the speed of output 60 is 1.556, provided the number of gear teeth of the pinions and gears is as set forth in FIG. 3.

An upshift to fifth gear from fourth gear results by maintaining clutch 62 engaged, engaging clutch 52, and disengaging clutch 66. Ring gear 56 of the third gear unit 34 is underdriven through clutch 62 relative to the speed of input 28 due to the speed reduction that occurs in gear unit 30. Carrier 50 is driven at the speed of input 28 through clutch 52. Sun gears 44, 54 are secured mutually; therefore, they rotate at the same speed. Similarly carrier 58 and ring gear 46 are secured mutually; therefore, they rotate at the same speed. With the transmission operating in fifth gear, the ratio of the speed of input 28 and the speed of output 60 is 1.252, provided the number of gear teeth of the pinions and gears is as set forth in FIG. 3.

An upshift to sixth gear from fifth gear results upon engaging clutch 66, disengaging clutch 62, and maintaining clutch 52 engaged. With the friction elements so disposed, clutch 52 driveably connects carrier 40 and input 28 to carrier 50 of the second gear unit 32, and clutch 66 driveably connects carrier 40 and input 28 to sun gear 42 of the second gear unit 32. The second gear unit 32 is locked-up; therefore, its ring gear 46 and output 60 rotate at the speed of the input 28. With the transmission operating in sixth gear, the ratio of the speed of input 28 and the speed of output 60 is 1.000.

An upshift to seventh gear from sixth gear results upon engaging clutch 64, disengaging clutch 66, and maintaining clutch 52 engaged. Clutch 64 driveably connects the ring gear 38 of the first gear unit 30 to the sun gears 44, 54, and clutch 52 driveably connects input 28 to carrier 50 of the second gear unit 32. A torque reduction and speed increase produced in the second gear unit 32 causes ring gear 46 and output 60 to rotate faster than the speed of input 28. With the transmission operating in seventh gear, the ratio of the speed of input 28 and the speed of output 60 is 0.807, provided the number of gear teeth of the pinions and gears is as set forth in FIG. 3.

An upshift to eighth gear from seventh gear results upon engaging brake 68, disengaging clutch 64, and maintaining clutch 52 engaged. With the friction control elements so disposed, clutch 52 driveably connects input 28 to carrier 50 of the second gear unit 32, and brake 68 holds sun gear 42 of the second gear unit 32 against rotation, thereby providing a torque reaction. The second gear unit 34 produces a torque reduction and speed increase, which overdrives its ring gear 46 and output 60 relative to the speed of input 28. With the transmission operating in eighth gear, the ratio of the speed of input 28 and the speed of output 60 is 0.698, provided the number of gear teeth of the pinions and gears is as set forth in FIG. 3.

A low-speed reverse gear is produced upon engaging clutch 64 and brake 53 concurrently, and releasing the other friction elements. Ring gear 38, the underdriven output of gear unit 30, underdrives sun gears 44, 54 through clutch 64 in a forward direction. With carrier 50 held against rotation by brake 53 and producing a torque reaction, the second gear unit 34 produces a second torque amplification and speed reduction, which further underdrives ring gear 46 and output 60 and reverses the direction of their rotation relative to those of input 28. With the transmission operating in low-reverse gear, the ratio of the speed of input 28 and the speed of output 60 is −5.211, provided the number of gear teeth of the pinions and gears is as set forth in FIG. 3.

A higher-speed reverse gear is produced upon engaging clutch 66 and brake 53, and releasing the other friction elements. Clutch 66 driveably connects carrier 40 of gear unit 30 and the input 28 to sun gear 42. With carrier 50 held against rotation by brake 53 and producing a torque reaction, the second gear unit 32 produces a torque amplification and speed reduction, which underdrives ring gear 46 and output 60 and reverses the direction of their rotation relative to those at input 28. With the transmission operating in high-reverse gear, the ratio of the speed of input 28 and the speed of output 60 is −2.316, provided the number of gear teeth of the pinions and gears is as set forth in FIG. 3.

The planetary gear unit formed by gear units 32, 34 includes five rotating members. A first member 70 connects clutch 62 and the ring gear 56 of gear unit 34. The second member 72 connects clutch 64 and sun gears 44, 54, which rotate as a unit. The third member 51 connects clutch 52 and brake 53 to second carrier 50. The fourth member 74 connects clutch 66 and brake 68 to sun gear 42. The fifth member 76 connects carrier 58, ring gear 46 and output 60 for rotation as a unit.

Figure 4:
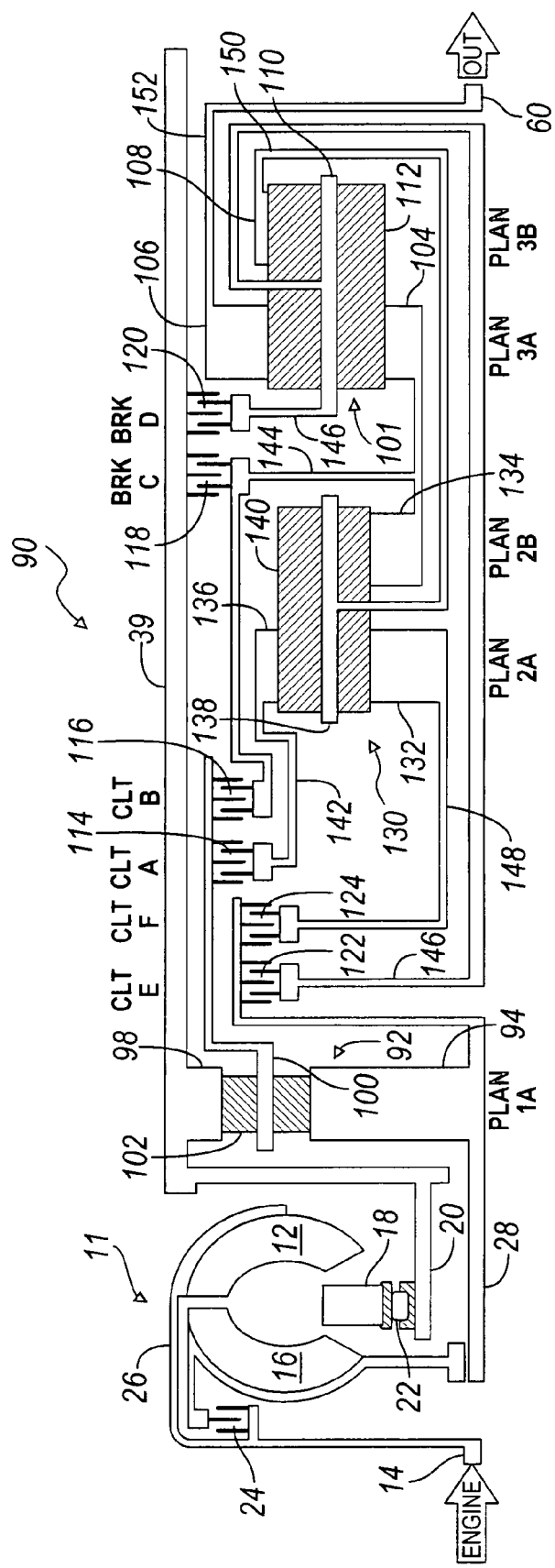
FIG. 4 is a schematic diagram illustrating a second embodiment of a transmission, which incorporates a modified Simpson gearset.

FIG. 4 illustrates the kinematic arrangement of an automatic transmission 90. In FIG. 4, each component that is identical to a component shown in FIG. 1 is referenced with the identical numeral as that used in FIG. 1 for the respective component. A speed reduction gear unit 92 includes a first sun gear 94 secured to input 28, a ring gear 98 grounded on the housing 39, a carrier 100, and planet pinions 102 supported on carrier 100 and meshing with sun gear 94 and ring gear 98. With ring gear 98 held against rotation, sun gear 94 driven by the input 28, and the gears and pinions having the number of gear teeth shown in FIG. 6, carrier 100 is underdriven at 0.400 times the speed of the input, and the gear ratio produced by gearset 32 is 2.500.

The second and third gear units 130 and 101 comprise the modified Simpson gearset. The second gear unit 130 includes axially spaced sun gears 132, 134, a ring gear 136, carrier 138, and long planetary pinions 140 rotatably supported on carrier 138 and in meshing engagement with sun gears 132, 134, and ring gear 136.

The third gear unit 101 includes a sun gear 104, axially spaced ring gears 106, 108, a carrier 110, and long planetary pinions 112, rotatably supported on carrier 110 in meshing engagement with sun gear 104 and ring gears 106, 108.

Clutch 114 alternately driveably connects and disconnects carrier 100 of the speed reduction gear set 92 and ring gear 136 of gear unit 130. Clutch 116 alternately connects and disconnects the carrier 100 of the speed reduction gear set 92 and sun gears 134, 104. Brake 118 alternately releases and holds sun gears 134, 104 against rotation. Brake 120 alternately releases and holds carrier 110 against rotation. Clutch 122 alternately driveably connects and disconnects the input 28 and carrier 110. Clutch 124 alternately driveably connects and disconnects the input 28 and sun gear 94 of the speed reduction gear set 30 to sun gear 132. The engaged and disengaged states of the clutches 114, 116, 122, 124 and the brakes 118, 120 for each of the eight forward gears and the two reverse gears of transmission 90 are shown in FIG. 5. The speed ratios produced by transmission 90 are shown in FIG. 5, provided the number of gear teeth of the pinions and gears is as set forth in FIG. 6.

The front planetary gear unit 92 is a simple planetary design, which includes input 28, fixed to sun gear 92; ring gear 98 fixed to ground 39; and carrier 100, a low speed output of the gear unit 92 that is secured to one side of clutch A 114 and one side of clutch B 116.

The gear unit 32, 101 comprise a modified Simpson design of six elements, one of which provides the output 60. Sun gears 134 and 104, ring gears 136 and 108, and carriers 138 and 110 constitute the Simpson gearset. There are two modifications to the Simpson gearset. In the first modification, carrier 138 and pinion 140 are extended so that an additional sun gear 132 can be in mesh with the pinion gear 140. Since sun gears 132 and 134 both have the same number of teeth, and pinion gear 140 has a constant number of teeth across its width, sun gear 132 is forced to always rotate at the same speed as sun gears 134 and 104. Sun gear 132 effectively becomes an extension of sun gears 134 and 104. This is done so that the sun gears 134 and 104 effectively have access to clutch F 124 via sun gear 132, while allowing a web from carrier 138 to fit between sun gears 132 and 134 and to have access to ring gear 108.

In the second modification, carrier 110 and pinion gear 112 are extended so that an additional ring gear 106 can be in mesh with the pinion gear 112. Since ring gears 106 and 108 both have the same number of teeth, and pinion gear 112 has a constant number of teeth across its width, ring gear 106 is forced to always rotate at the same speed as ring gear 108. Ring gear 106 effectively becomes an extension of ring gear 108 and carrier 138. This is done so that carrier 138 and ring gear 108 effectively have access to output 60 via ring gear 106, while allowing a web from carrier 110 to fit between ring gears 106 and 108 and to have access to Clutch E.

Operation of the transmission 90 is described next with reference to the engaged and disengaged state of the friction elements, which states in combination produce each of the gear ratios. Preferably, the states of the clutches and brakes are changed automatically in accordance with execution of a control algorithm by an electronic transmission controller. FIG. 5 is a chart indicating the state of engagement and disengagement of the clutches and brakes corresponding to each the gear ratios. In the chart, symbol "X" identifies an engaged friction clutch and friction brake. A blank indicates that the corresponding clutch and brake is disengaged or released. FIG. 5 shows for each forward and reverse gear the operating state of the clutches and brakes that control the transmission of FIG. 4 and the speed ratio for the respective gear.

The transmission operates in the first forward gear when clutch 114 and brake 120 are engaged, and the other friction elements are disengaged. With ring gear 98 of the first gear unit 92 held against rotation and sun gear 94 of the first gear unit 92 directly connected to input 28, carrier 100 is underdriven, and ring gear 136 is underdriven relative to the speed of input 28 through clutch 114. Brake 120 holds carrier 110 against rotation and produces a torque reaction on the transmission case 39. With carrier 110 held against rotation, sun gears 134, 104 mutually secured to rotate at the same speed, and carrier 138 and ring gear 108 secured mutually for rotation at the same speed, ring gear 106 and output 60 are underdriven due to an additional speed reduction. With the transmission operating in first gear, the ratio of the speed of input 28 and the speed of output 60 is 7.097, provided the number of gear teeth of the pinions and gears is as set forth in FIG. 6.

As FIG. 5 shows, the transmission operates in each of the five lowest forward gears when clutch 114 is engaged; therefore, when transmission 90 operates in each of the five lowest forward gears, ring gear 136 is underdriven relative to the speed of input 28.

An upshift to the second speed ratio results by maintaining clutch 114 engaged, engaging brake 118, and disengaging brake 120. Ring gear 136 is underdriven relative to the speed of input 28 due to the speed reduction produced in gear unit 92. Sun gears 134, 104, fixed against rotation due to the engagement of brake 118, provide a torque reaction. Ring gear 106 and output 60 are underdriven relative to the ring gear 136 due to a second speed reduction produced in gear units 130, 101. With the transmission operating in second gear, the ratio of the speed of input 28 and the speed of output 60 is 3.886, provided the number of gear teeth of the pinions and gears is as set forth in FIG. 6.

An upshift to third gear from second gear results upon disengaging brake 118, engaging clutch 116, and maintaining clutch 114 engaged. Ring gear 136 is underdriven through clutch 114 relative to the speed of the input due to the speed reduction produced in the first gear unit 92. Clutch 116 driveably connects carrier 100 to sun gears 134, 104. Because the speeds of sun gears 134, 104 and ring gear 136 are equal and underdriven relative to the speed of input 28, carrier 110, ring gear 106 and output 60 are underdriven at that same speed. With the transmission operating in third gear, the ratio of the speed of input 28 and the speed of output 60 is 2.500.

An upshift to fourth gear from third gear results upon engaging clutch 124, disengaging clutch 116, and maintaining clutch 114 engaged. Clutch 124 driveably connects sun gear 132 and input 28. Clutch 114 driveably connects carrier 100 to ring gear 136. Due to the speed reduction produced in the first gear unit 32, ring gear 106 is underdriven relative to the speed of the input 28. With the transmission operating in fourth gear, the ratio of the speed of input 28 and the speed of output 60 is 1.629, provided the number of gear teeth of the pinions and gears is as set forth in FIG. 6.

An upshift to fifth gear from fourth gear results by maintaining clutch 114 engaged, engaging clutch 122, and disengaging clutch 124. Ring gear 136 is underdriven through clutch 114 relative to the speed of input 28 due to the speed reduction that occurs in gear unit 92. Carrier 110 is driven at the speed of input 28 through clutch 122. Sun gears 134, 104 are secured mutually; therefore, they rotate at the same speed. With transmission 90 operating in fifth gear, the ratio of the speed of input 28 and the speed of output 60 is 1.268, provided the number of gear teeth of the pinions and gears is as set forth in FIG. 6.

An upshift to sixth gear from fifth gear results upon engaging clutch 124, disengaging clutch 114, and maintaining clutch 122 engaged. With the friction elements so disposed, clutch 122 driveably connects input 28 to carrier 110, and clutch 124 driveably connects input 28 to sun gear 132. The second gear units 130, 101 are locked-up; therefore, ring gear 106 and output 60 rotate at the speed of the input 28. With the transmission operating in sixth gear, the ratio of the speed of input 28 and the speed of output 60 is 1.000.

An upshift to seventh gear from sixth gear results upon engaging clutch 116, disengaging clutch 124, and maintaining clutch 122 engaged. Clutch 116 driveably connects carrier 100 of the first gear unit 92 to the sun gears 134, 104, and clutch 122 driveably connects input 28 to carrier 110 of gear unit 101. A torque reduction and speed increase produced in the second gear unit 130 causes ring gear 106 and output 60 to rotate faster than the speed of input 28. With the transmission operating in seventh gear, the ratio of the speed of input 28 and the speed of output 60 is 0.794, provided the number of gear teeth of the pinions and gears is as set forth in FIG. 6.

An upshift to eighth gear from seventh gear results upon engaging brake 118, disengaging clutch 116, and maintaining clutch 122 engaged. With the friction control elements so disposed, clutch 122 driveably connected input 28 to carrier 110 of the gear unit 101, and brake 118 holds sun gears 134, 104 against rotation, thereby providing a torque reaction. Gear unit 101 produces a torque reduction and speed increase, which overdrives its ring gear 106 and output 60 relative to the speed of input 28. With the transmission operating in eighth gear, the ratio of the speed of input 28 and the speed of output 60 is 0.698, provided the number of gear teeth of the pinions and gears is as set forth in FIG. 6.

A low-speed reverse gear is produced upon engaging clutch 116 and brake 120 concurrently, and releasing the other control elements. Carrier 100, the underdriven output of gear unit 92, underdrives sun gears 134, 104 in a forward direction through clutch 116. With carrier 110 held against rotation by brake 120 and producing a torque reaction, the gear unit 101 produces a second torque amplification and speed reduction, which further underdrives ring gear 106 and output 60 and reverses the direction of their rotation relative to those of input 28. With the transmission operating in low-reverse gear, the ratio of the speed of input 28 and the speed of output 60 is −5.790, provided the number of gear teeth of the pinions and gears is as set forth in FIG. 6.

A higher-speed reverse gear is produced upon engaging clutch 124 and brake 120, and releasing the other control elements. Clutch 124 driveably connects the input 28 and sun gear 94 to sun gear 132. With carrier 110 held against rotation by brake 120 and producing a torque reaction, the gear unit 101 produces a torque amplification and speed reduction, which underdrives ring gear 106 and output 60 and reverses the direction of their rotation relative to those at input 28. With the transmission operating in high-reverse gear, the ratio of the speed of input 28 and the speed of output 60 is −2.316, provided the number of gear teeth of the pinions and gears is as set forth in FIG. 6.

The modified Simpson gearset formed by gear units 130, 101 includes six rotating members. The first rotating member 142 connects clutch 114 and the ring gear 136 of gear unit 130. The second rotating member 144 connects clutch 116 and brake 118 to sun gear 134 of gear unit 130 and to sun gear 104 of gear unit 101. The third rotating member 146 connects brake 120 and clutch 122 to carrier 110 of gear unit 101. The fourth rotating member connects clutch 124 to sun gear 132 of gear unit 130. The fifth rotating member connects carrier 138 of gear unit 130 to ring gear 108 of gear unit 101. The sixth rotating member connects ring gear 106 of gear unit 101 to output 60.

From FIGS. 2 and 5 it can be seen that the same clutch and brake engagement pattern is used for the embodiments of FIGS. 1 and 4. For example, clutch A 62, 114 and brake D 53, 120 are engaged for first gear for both embodiments, clutch A 62, 114 and brake C 68, 118 are engaged for second gear second for both embodiments, etc.

In accordance with the provisions of the patent statutes, the preferred embodiment has been described. However, it should be noted that the alternate embodiments can be practiced otherwise than as specifically illustrated and described.

What is claimed is:

1. A multi-speed automatic transmission comprising:
an input;
an output;
a first gear unit drivable connected to the input and including a component rotating at the speed of the input and a first gear unit output, the first gear unit producing a gear ratio of a speed of the input and a speed of the first gear unit output, the gear ratio being greater than unity;
a second gear unit including first and second sun gears, a first ring gear, a first carrier, and first planet pinions supported on the first carrier and engaged with the first sun gear, second sun gear and first ring gear;
a third gear unit including a third sun gear secured to the second sun gear, a second ring gear secured to the output, a third ring gear secured to the first carrier, a second carrier, and second planet pinions supported on the second carrier and engaged with the third sun gear, the second ring gear and the third ring gear;
a first clutch being operable alternately to connect and disconnect the first gear unit output and the first ring gear;
a second clutch being operable alternately to connect and disconnect the first gear unit output to the second sun gear and third sun gear;
a third clutch being operable alternately to connect and disconnect the input and the second carrier;
a fourth clutch being operable alternately to connect and disconnect the input and the first sun gear;
a first brake being operable alternately to release and to hold the second sun gear and third sun gear against rotation; and
a second brake being operable alternately to release and to hold the second carrier against rotation.

2. The transmission of claim 1, wherein:
a low-reverse gear having a first reverse speed ratio is produced when the second clutch and second brake are engaged.

3. The transmission of claim 1, wherein:
a low-reverse gear having a second reverse speed ratio less than the first reverse speed ratio is produced when the fourth clutch and second brake are engaged.

* * * * *